Figure 1:
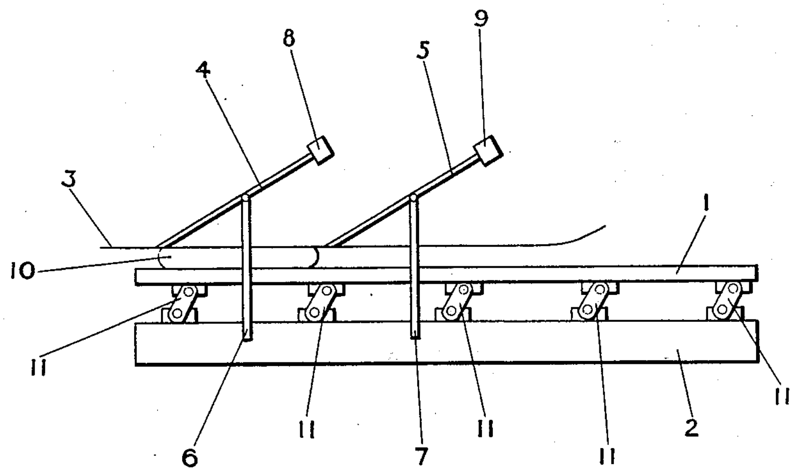

Aug. 23, 1960 O. R. PIGOTT ET AL 2,949,844

PACKING OF POWDERY OR GRANULAR MATERIALS

Filed July 30, 1958

INVENTORS:
Owen Rupert Pigott, and
Kenneth Alan Sproat,
BY Cushman, Darby & Cushman
ATTORNEYS.

United States Patent Office 2,949,844

Patented Aug. 23, 1960

1

2,949,844

PACKING OF POWDERY OR GRANULAR MATERIALS

Owen Rupert Pigott, Welwyn Garden City, and Kenneth Alan Sproat, Blackpool, England, assignors to Imperial Chemical Industries Limited, London, England, a corporation of Great Britain Filed July 30, 1958, Ser. No. 752,097

Claims priority, application Great Britain Aug. 2, 1957

7 Claims. (Cl. 100—144)

This invention relates to improvements in the packing of powdery and granular materials.

It is common practice where powdery and granular materials are packaged in amounts of, for example, 25 to 100 pounds, to pack the material in multi-ply paper sacks. Also, with the widespread use of mechanical handling equipment, paper sacks containing such material are lifted and stacked on wooden pallets. The material is stored by stacking several layers of filled sacks on a pallet and placing a second loaded pallet on top of the first loaded pallet by means of a lifting device. While there is clearly an advantage in stacking filled sacks in this way on pallets since the stacking can be done mechanically, there is a limitation to the height that pallets may be stacked one on another through instability of the stack itself, and in order that the available storage space is used in the best possible way it is important to ensure that each pallet load is as low and as well stacked as possible. This can be done by flattening the filled sacks before they are placed on the pallet because this gives a lower and better bonded pallet load, and enables more pallets to be stacked to a greater height through increased stability than is possible with unflattened sacks as received from the filling device. Useful results have been obtained by passing the filled sacks containing free flowing powders between rollers under a small pressure, but this method has not been found to be very effective with filled sacks containing powders that are not free flowing, and sometimes there is even a tendency for the sack to burst under the pressure of the rollers.

An object of the present invention is to provide an improved apparatus and method for flattening sacks containing powdery or granular materials of all types, sticky as well as free flowing. A further object of this invention is to provide such apparatus forming part of the normal mechanical handling equipment of a filled sack conveying system.

According to the present invention we provide an apparatus for flattening sacks filled with powdery or granular material that comprises a vibratory table to support said sacks having a direction of vibration inclined at less than 90° to the plane of the table in the direction of travel of said sacks with a vertical component capable of suspending said powdery or granular material and a horizontal component capable of conveying the sack along the table, and a heavy platen freely movable about a stationary supporting means in at least a direction having a vertical component and adapted to rest on a filled sack as it moves along said table, said platen being at least as long and as wide as a filled sack. Further according to our invention we provide a method of flattening sacks filled with powdery or granular material which comprises causing a filled sack to be conveyed along a vibrating table having a direction of vibration inclined at less than 90° to the plane of the table in the direction of travel of said sacks with a vertical component capable of suspending said powdery or granular material and a horizontal component capable of conveying the sack along the table and while being so conveyed said sack being caused to support a heavy platen which is at least as long and as wide as the sack and which is free to move about a stationary supporting means in at least a direction having a vertical component.

2

In order to illustrate our invention one embodiment thereof is hereinafter described with reference to the attached drawings Figures 1 and 2 of which are side and end elevational views of the apparatus respectively.

The vibrating table 1 is mounted on the support 2 by means of the vibrating legs 11. The legs 11 are set at an angle of 55° to the horizontal. Vibrating tables are commercially available and are used for conveying materials. Such vibrating tables are disclosed, for example, in United States Patents Nos. 2,094,787 and 2,629,485. In this embodiment the table used is 7 feet long and 2 feet wide, and has a frequency of 1,300 cycles per minute, a vibration amplitude of ¼ inch, and an angle of vibration of 55° to the plane of the table. The platen 3 is 6 feet long and is supported by the counterbalanced arms 4 and 5. These arms are pivoted to the bars 6 and 7 which are fixed at their lower ends to the support 2. The counter-balancing weights 8 and 9 are adjustable so that the platen may be wholly or partly counterbalanced, and the assembly of the platen and counterbalancing weights is arranged to have a high inertia. The platen is as fully counterbalanced as is consistent with obtaining a well flattened sack since in this condition the time required for the passage of the sack along the table will be a minimum. The weight of the platen is 40 lbs. A filled sack is shown at 10.

Figure 2:
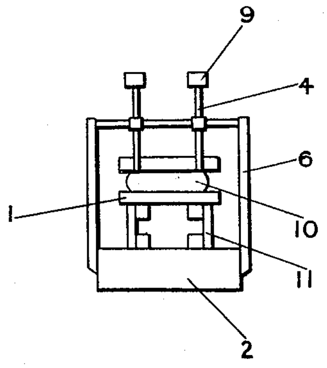

The filled sacks are fed from the right hand end of Figure 1, and the end of the platen on that side has an upward curve to allow the sacks to move easily underneath it. The position of the platen along the table is adjustable and it may be moved to any position along the length of the table by moving the bars 6 and 7.

Where the nature of the packed materials requires a lighter or heavier platen to give the desired flattening effect, this can be effected by changing the weights 8 and 9 or their distance from the pivot. By mounting the platen so that it is carried by members pivoted about a horizontal axis on stationary supporting means with the members having on the side of the pivot remote from the platen adjustable counterbalancing weights it is possible to adjust the flattening effect of the platen very easily and quickly to suit any type of filled sack. The platen can alternatively be a sheet of relatively light material hinged to a support at the feed end of the table and carrying a weight sufficiently heavy to give the desired effect. For different conditions, different weights can be used.

For different materials different operating conditions may be required. For example, for materials that are not easily free flowing e.g. finely powdered materials, high frequencies may be needed. In general we find that frequencies of 1,000 cycles per minute and greater give the best results and that it is more convenient to operate the vibrating table at a fixed high frequency preferably within the range 1,000 to 2,000 cycles per minute, and to adjust the amplitude to allow for any differences in the packed material. For example by using a vibrating table having a frequency of 1,300 cycles per minute and a maximum amplitude of ¼ inch, we have found that most materials can be satisfactorily processed by using the maximum amplitude for non-free flowing powders and reducing the amplitude to, for example, ⅛ inch for free flowing materials. If the angle of the direction of vibration is increased, good flattening is obtained but the speed of horizontal movement is reduced. For optimum results, we prefer that the direction of vibration should be at an angle of from 50° to 60° preferably about 55° to the plane of the vibrating table.

We prefer that the platen should be not less than about twice the length of the filled sack.

Our apparatus can be used successfully with powdery or granular material covering a wide range of particle sizes. For example, it can be used with polyvinyl chloride in both powder and granular form, nylon chip, urea-formaldehyde and phenol-formaldehyde moulding powders, and polythene and polymethyl methacrylate moulding granules. It can form part of the conveying part of an existing bag filling and storing system without needing any extra floor space. The actual installation position has little effect and the apparatus can be installed at a slight angle to the horizontal, e.g. ±3°, without affecting its performance.

By the use of our apparatus the capacity of a store where the filled sacks are stacked on pallets can be appreciably increased.

We claim:

1. Apparatus for flattening sacks filled with powdery or granular material that comprises a vibratory table to support said sacks having a direction of vibration inclined at less than 90° to the plane of the table in the direction of travel of said sacks with a vertical component capable of suspending said powdery or granular material and a horizontal component capable of conveying the sack along the table, and a heavy platen freely movable about a stationary supporting means in at least a direction having a vertical component and adapted to rest on a filled sack as it moves along said table, said platen being at least as long and as wide as a filled sack.

2. Apparatus according to claim 1 in which said platen is carried by at least one member pivoted about a horizontal axis on stationary supporting means with the member having on the side of the pivot remote from the platen an adjustable counterbalancing weight.

3. Apparatus according to claim 2 in which the assembly of platen and counterbalancing weight is arranged to have a high inertia.

4. Apparatus according to claim 1 in which the platen is not less than twice the length of the filled sack that it is intended to flatten.

5. Apparatus according to claim 1 in which said table is adapted to vibrate at a frequency not less than 1,000 cycles per minute.

6. Apparatus according to claim 5 in which said table has a maximum amplitude of ¼ inch.

7. Apparatus according to claim 1 in which the direction of vibration of said table is at an angle of 50 to 60° to the plane of the table.

No references cited.